United States Patent [19]

Gerfast

[11] Patent Number: 4,581,667

[45] Date of Patent: Apr. 8, 1986

[54] MAGNETIC HOLD-DOWN FOR RECORDING DISC

[75] Inventor: Sten R. Gerfast, Mendota Heights, Minn.

[73] Assignee: Minnesota Mining and Manufacturing Company, St. Paul, Minn.

[21] Appl. No.: 451,038

[22] Filed: Dec. 20, 1982

Related U.S. Application Data

[63] Continuation-in-part of Ser. No. 369,903, Apr. 19, 1982, abandoned.

[51] Int. Cl.$^4$ .............................................. G11B 5/012
[52] U.S. Cl. ...................................... 360/97; 360/133
[58] Field of Search .................................. 360/97–99, 360/133; 369/270–271

[56] References Cited

U.S. PATENT DOCUMENTS

| 3,593,327 | 7/1971 | Shill | 360/97 |
| 3,706,085 | 12/1972 | Mowrey | 360/97 |
| 4,224,648 | 9/1980 | Roling | 360/97 |
| 4,351,047 | 9/1982 | Redlich et al. | 369/270 |

FOREIGN PATENT DOCUMENTS 56-74863  6/1981  Japan .................................. 369/270

Primary Examiner—A. J. Heinz
Attorney, Agent, or Firm—Donald M. Sell; James A. Smith; David W. Anderson

[57] ABSTRACT

Three or more ferromagnetic elements are symmetrically arranged about the face of a permanent-magnet rotor of a turntable motor. Those elements extend to a plane perpendicular to the axis of a rotor. When a magnetic recording disc which has a rigid, planar ferromagnetic surface is moved toward that plane, magnetic attraction secures the disc to the turntable. Preferably the turntable includes a spindle which fits into a central opening in the disc to center the disc on the turntable.

7 Claims, 6 Drawing Figures

MAGNETIC HOLD-DOWN FOR RECORDING DISC

CROSS-REFERENCE TO RELATED APPLICATION

This application is a continuation-in-part of applicant's copending application Ser. No. 369,903, filed Apr. 19, 1982 and now abandoned.

TECHNICAL FIELD

This invention concerns hold-down mechanism for securing a recording disc to a disc drive.

BACKGROUND ART

Cartridges containing single rigid magnetic recording discs are widely used in electronic data processing equipment. One such cartridge contains a flat aluminum disc having a large central opening bridged by a flexible stainless steel diaphragm which has a central spindle opening. The corresponding disc drive has a turntable including a magnetic ring that magnetically latches to a cold-rolled ferromagnetic steel collar on the aluminum disc. Fixed at the center of the turntable is a tapered spindle. The spindle opening in the steel diaphragm is slightly constricted so as to fit snugly onto the spindle before the disc becomes magnetically latched to the turntable. The flexibility of the diaphragm permits the disc to continue to move into the latched position until it fits tightly against the turntable while being held by the spindle against any radial movement.

Other current hold-down mechanisms for rigid magnetic recording discs are believed to be about as expensive as that described above. Mechanisms for positioning rigid optical recording discs are also expensive.

DISCLOSURE OF THE INVENTION

The present invention provides a recording disc hold-down mechanism which should be as reliable as those of the prior art while being comparatively inexpensive. Like the above-described prior mechanism, that of the present invention requires that the disc have a rigid, planar ferromagnetic surface, and the mechanism includes a turntable against which that rigid ferromagnetic surface may be secured.

The hold-down mechanism differs from the prior mechanism in that the motor which drives the turntable has a permanent magnet rotor, and the turntable comprises at least three ferromagnetic elements arranged about the face of the rotor, which elements extend from the magnet to a plane perpendicular to the axis of the rotor so that when the rigid ferromagnetic surface of the disc contacts said elements, magnetic flux from the rotor magnet secures the disc to the elements.

Like the above-described prior mechanism, the turntable may have a central spindle, and the disc may have a central spindle opening. Also as in the prior mechanism, the spindle may be tapered and the spindle opening may be slightly constricted, there being means permitting the rigid ferromagnetic surface of a spindled disc to move axially toward the turntable against the bias of a spring, thus insuring a snug spindle fit when the disc is magnetically secured to the turntable.

In one embodiment of the invention, the axial movement of the spindled disc is provided by a spindle which has a cylindrical shaft that fits snugly and slidably into a cylindrical opening at the center of the turntable, which pin locks the two against relative rotational movement. There is a flat radial surface at the base of the crown, and the turntable has a flat radial surface at the open end of its cylindrical opening. A shaped annular leafspring between the two flat radial surfaces biases the spindle outwardly and permits a disc on the spindle to be moved axially against the bias of the spring until being secured to the turntable by the magnetic attraction between its ferromagnetic elements and the ferromagnetic surface of the disc.

While the ferromagnetic elements may be protrusions of the rotor magnet, it may be more economical to provide magnetically-soft projections from the face of the rotor. If the rotor magnet has a magnetically-soft casing, such projections can be provided at low cost by punching and folding the casing outwardly at three or more symmetrically-positioned locations. Each ferromagnetic element may be provided by a pair of such projections which are spaced from each other by a small gap. Another economical technique is to secure adhesively at least three magnetically-soft buttons to the rotor magnet face.

The rotor magnet may be magnetized to have a single pole across the face of the rotor and an opposite pole at its underlying surface. However, the magnetic attraction to the disc is stronger if the rotor magnet is magnetized to have sectors of alternating polarity at the rotor face, and each ferromagnetic element is positioned over one of the sectors.

As in the above-described prior mechanism, the present invention may be used to position a flat metal recording disc. However, the invention may have its greatest utility when the recording disc has a rigid ferromagnetic surface of the type shown in U.S. Pat. No. 3,373,413 (Treseder) or in German Offenlegungsschrift No. 2,342,890 (Boissevain). These and a number of other patents show magnetic recording discs, each consisting of a flexible magnetic recording sheet stretched across a rigid support. Such a recording disc can be made far less expensively than ordinary rigid magnetic recording discs in that the rigid disc-support can be stamped out of sheet metal. By punching the spindle opening and periphery simultaneously, the spindle opening can be precisely centered, thus providing perfect balance for high-speed rotation.

Although the present invention is primarily intended for positioning magnetic recording discs, the disc may be recordable by optical, electrostatic or any other means. For example, a flexible recording sheet may have a coating comprising a thermoplastic resin binder and a substance capable of absorbing energy from a pulse-encoded laser beam which records information in the form of depressions or holes surrounded by sharply defined ridges. See European patent application No. 78300865.9 filed Dec. 19, 1978, which is based on U.S. patent application Ser. No. 862,069 filed Dec. 19, 1977.

Because the recording surface of any recording disc tends to be highly susceptible to damage from fingerprints and should also be protected from dust, recording discs are normally used in cartridges. A typical cartridge has a removable or retractable cover or panel to provide access to the recording surface and, if necessary, to provide access to the spindle opening of the disc.

DRAWING

DESCRIPTION OF THE PREFERRED EMBODIMENTS

Figure 1:
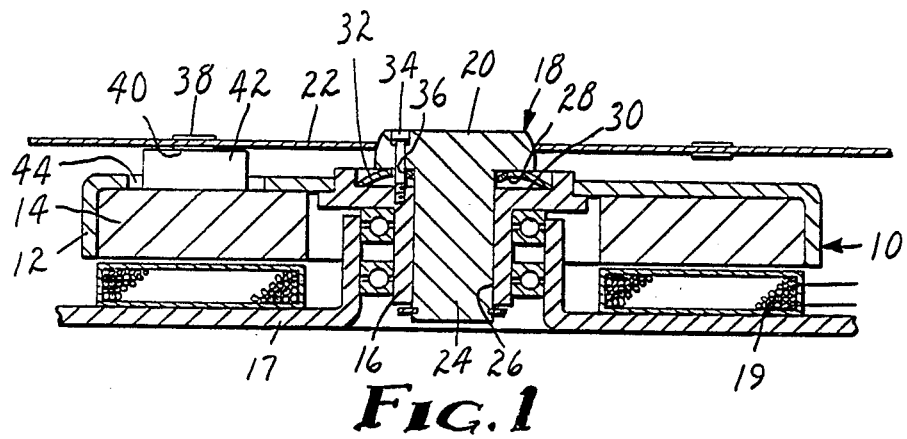
FIG. 1 is a partial schematic central cross-section of one disc-hold-down mechanism of the invention with a rigid recording disc positioned for recording.

Referring to FIG. 1, a turntable 10 is driven by a brushless DC motor, the rotor of which comprises a cylindrical metal housing 12, an annular permanent magnet 14, and a hub 16 which is rotatably journalled in a frame 17 for a stator 19. A spindle 18 has a crown 20 which is conical where it receives a rigid flat metal recording disc 22 and is spherical above its conical area to facilitate positioning of the disc. The spindle 18 also has a cylindrical shaft 24 which is coaxial with the conical surface of its crown 20 and fits snugly, but slidably, into a cylindrical opening 26 at the center of the hub 16. There is a flat radial surface 28 at the base of the crown 20 and a flat, indented radial surface 30 at the outer end of the cylindrical opening 26. A shaped annular leafspring 32 between the flat surfaces 28 and 20 biases the spindle axially outward. A pin 34 fits snugly and slidably within a cylindrical opening in the crown 20, passes through an oversize opening 36 in the spring 32, and is threaded into the hub 16 so that the spindle 18 and the turntable 10 rotate together.

Because flat metal recording discs, whether magnetically or optically recordable, usually have aluminum substrates, a pair of cold-rolled ferromagnetic steel collars 38 and 40 are mechanically attached to the disc 22, thus providing magnetic attraction to three magnetically-soft ferromagnetic steel buttons 42 which are adhered to and insulated from the housing 12 by a thermoset adhesive 44. The buttons 42 are symmetrically positioned 120° apart to latch the disc 22 to the turntable 10 against the bias of the leafspring 32.

Figure 2:
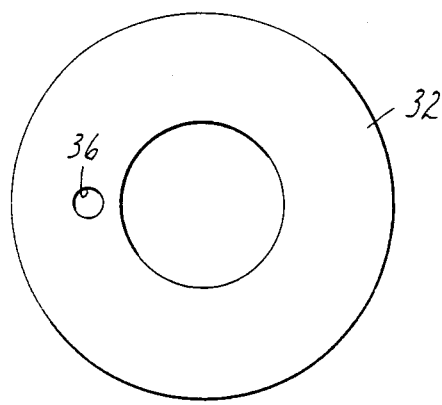
FIG. 2 shows the annular leafspring of FIG. 1, enlarged.

FIG. 2 shows the shaped annular leafspring 32 and its oversize opening 36 for the pin 34.

Figure 3:
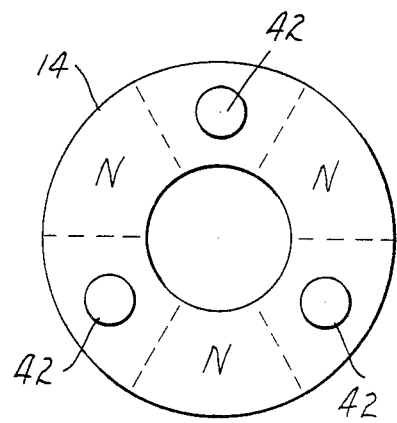
FIG. 3 shows at reduced scale the face of the rotor magnet of FIG. 1 and a preferred pattern of magnetization.

FIG. 3 shows a preferred pattern of magnetization of the rotor magnet 14 and positioning of the adhered magnetically-soft steel buttons 42.

Figure 4:
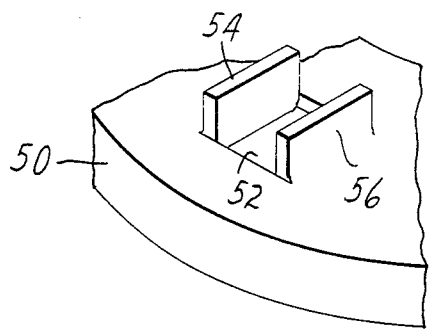
FIG. 4 is a fragmentary isometric view of the permanent magnet rotor of another disc-hold-down mechanism of the invention.

The rotor shown fragmentally in FIG. 4 comprises a cylindrical metal housing 50 and an annular permanent magnet 52. The housing has been punched and folded to provide three pairs of magnetically-soft projections at positions 120° apart, one pair 54, 56 of which is shown. Preferably these are six poles at the face of the magnet 52, and one of each pair of projections 54, 56 overlies a north pole while the other overlies a south pole. The extremities of the six projections lie in a plane perpendicular to the rotor axis and together provide a turntable for a recording disc such as the disc 22 of FIG. 1.

Figure 5:
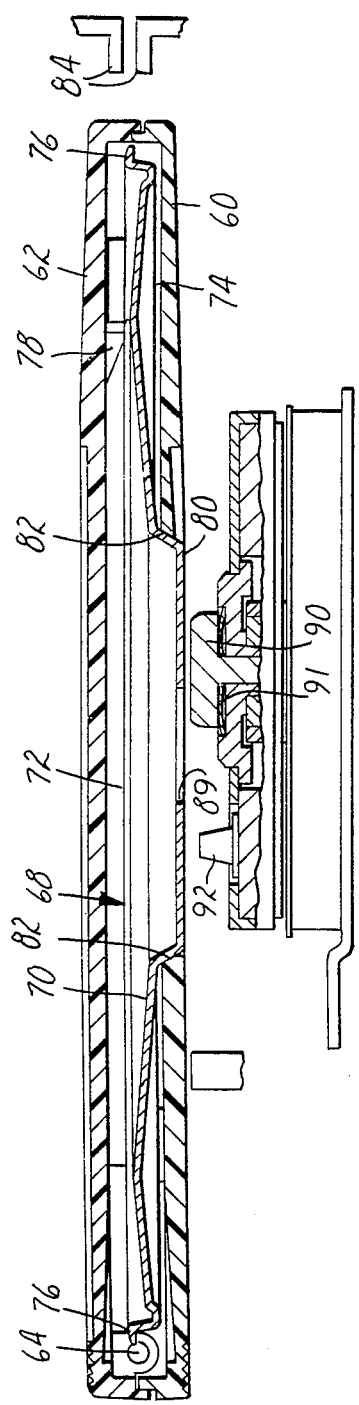
FIG. 5 is a partial schematic central cross-section of another embodiment of the invention for use with a cartridge containing a rigid recording disc.
Figure 6:
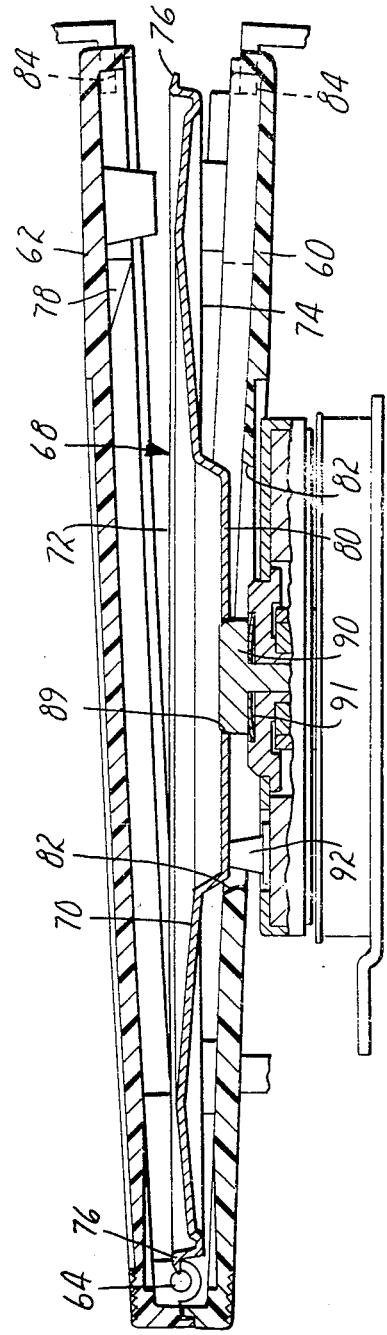
FIG. 6 is a partial schematic central cross-section of the FIG. 5 embodiment wherein the cartridge has been moved into operative position.

The cartridge of FIGS. 5 and 6 consists of a receptacle 60 and a cover 62 which are connected by two hinge pins 64 at one edge and are latched at the opposite edge. The cartridge contains a magnetic recording disc 68 consisting of a rigid support 70 and two magnetic recording sheets 72, 74 stretched across the support. The support 70 has a rim 76 to which the outer edge of the recording sheet 72 is secured. At least three projections 78 (one shown) on the underside of the cover contact the rim 76 to force the hub 80 of the rigid support 70 into a conical seat 82 in the receptacle 60 when the cartridge is closed.

Upon being inserted into a drive mechanism as shown in FIG. 5, four prongs 84 on the drive fit into cartridge openings to unlatch and lift the cover 62 while lowering the receptacle 60 to the position shown in FIG. 6. The lowering of the receptacle 60 allows a central opening 89 in the hub 80 of the rigid disc support 70 to fit onto a tapered spindle 90 which can move axially a short distance against the bias of a shaped annular leaf spring 91.

The turntable for the drive is provided by three symmetrically-positioned magnetically-soft steel buttons 92 (one shown) which are adhered to the face of the housing of a permanent-magnet rotor. The rigid disc support 70 is also magnetically soft, and the strength of the magnet is such that the magnetic attraction draws the disc support 70 tightly against the spindle 90 and causes the spindle to retract slightly against the bias of the leaf spring 91, thus securing the support to the turntable. Magnetic heads (not shown) are then moved from a retracted position through the opening between the receptacle 60 and cover 62 into operative positions.

While the tripod effect of three separate ferromagnetic elements (buttons 42 of FIG. 3) or three pairs of ferromagnetic elements (projections 54, 56 of FIG. 4) is preferred, those ferromagnetic elements could be combined into one cylindrical rib or a series of two or more elongated ribs, but this would involve the expense of machining lengthy surfaces to a plane perpendicular to the axis of the rotor.

I claim:

1. Mechanism for securing a recording disc, having a central axis and a rigid planar ferromagnetic surface perpendicular to said axis, to a turntable which is rotatably driven about a drive axis and which includes a cylindrical permanent magnet concentrically disposed with respect to said drive axis and having a surface adjacent to said disc ferromagnetic surface, said mechanism comprising:

three separate ferromagnetic elements arranged about said magnet surface and radially spaced equidistantly from said drive axis, said elements having extremities spaced away from said magnetic surface which define a plane perpendicular to said drive axis to contact said disc planar surface and conduct magnetic flux from said permanent magnet to said ferromagnetic surface of said recording disc for positioning a said recording disc in a plane perpendicular to said drive axis.

2. Mechanism as defined in claim 1 wherein the ferromagnetic elements are protrusions of said permanent magnet.

3. Mechanism as defined in claim 1 wherein the ferromagnetic elements are magnetically-soft projections.

4. Mechanism as defined in claim 1 further including a magnetically-soft ferromagnetic casing in contact with said magnet and disposed between said magnet and said disc, said casing including at least three separated pairs of projections defining said ferromagnetic elements.

5. Mechanism as defined in claim 4 wherein said magnet is magnetized to have sectors of alternating north and south polarities and one of each pair of projections overlies a north pole while the other overlies a south pole.

6. Mechanism as defined in claim 1 wherein said magnet is magnetized such that said magnet surface is a single pole.

7. Mechanism as defined in claim 1 wherein said turntable includes a central spindle.

* * * * *